ations of Ser. No. 616,158, Feb. 15, 1967,
United States Patent

MacLeay et al.

[11] 3,917,744
[45] Nov. 4, 1975

[54] TERTIARY-ALIPHATIC α-(PERACYL)AZO COMPOUNDS AS INITIATORS FOR THE POLYMERIZATION OF UNSATURATED POLYESTERS AND VINYL MONOMERS

[75] Inventors: Ronald Edward MacLeay, Williamsville; Chester Stephen Sheppard, Tonawanda, both of N.Y.

[73] Assignee: Pennwalt Corporation, Philadelphia, Pa.

[22] Filed: Mar. 13, 1974

[21] Appl. No.: 450,639

Related U.S. Application Data

[60] Division of Ser. No. 88,109, Nov. 9, 1970, Pat. No. 3,830,797, which is a continuation-in-part of Ser. No. 725,180, April 29, 1968, abandoned, which is a continuation of Ser. No. 616,158, Feb. 15, 1967, abandoned, which is a continuation of Ser. No. 409,306, Nov. 5, 1964, abandoned.

[52] U.S. Cl......... 260/861; 260/88.3 R; 260/88.7 D; 260/89.5 A; 260/91.5; 260/92.8 R; 260/93.5 R; 260/94.2 R; 260/94.4; 260/94.6; 260/152; 260/157; 260/174
[51] Int. Cl.²................. C08L 67/06; C07C 107/02
[58] Field of Search........................... 260/861, 92.8

[56] References Cited
UNITED STATES PATENTS
3,649,614  3/1972  Sheppard............................ 260/174
3,752,802  8/1973  Sheppard............................ 260/192
FOREIGN PATENTS OR APPLICATIONS
40-28459  12/1965  Japan................................. 260/192

*Primary Examiner*—Paul Lieberman
*Attorney, Agent, or Firm*—Charles E. Feeny; William D. Mitchell

[57] ABSTRACT
New tertiary-aliphatic alpha-(peracyl)azo compounds represented by the formula

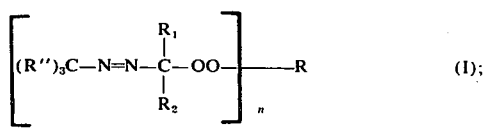

(I);

processes for preparing I where R is

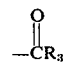

and $n$ is 1 or

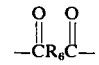

and $n$ is 2 by reacting a t-aliphatic α-chloroazo compound

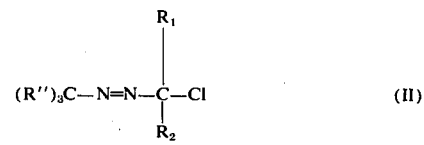

(II)

with peracids or their salts selected from

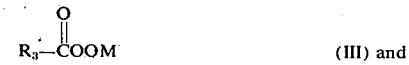

(III) and

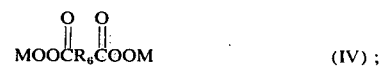

(IV);

processes for preparing compounds I by reacting t-aliphatic azo compounds of the formula

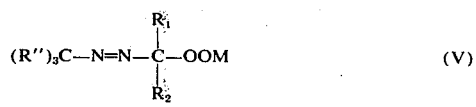

(V)

with the corresponding acylating agent; and the use of these compounds as polymerization initiators for vinyl monomers and as curing agents for resins. For example, 2-t-butylazo-2-(acetylperoxy)-4-methylpentane is prepared by reacting the sodium salt of 2-t-butylazo-2-hydroperoxy-4-methylpentane with acetyl chloride; and the product used to polymerize vinyl chloride at 30°C. and to cure unsaturated polyester-styrene resins at room temperature.

6 Claims, No Drawings

TERTIARY-ALIPHATIC α-(PERACYL)AZO COMPOUNDS AS INITIATORS FOR THE POLYMERIZATION OF UNSATURATED POLYESTERS AND VINYL MONOMERS

CROSS-REFERENCE TO RELATED APPLICATIONS

This is a division of application Ser. No. 88,109, now U.S. Pat. No. 3,830,797, filed Nov. 9, 1970, which in turn is a continuation-in-part of application Ser. No. 725,180, filed Apr. 29, 1968, now abandoned which in turn is a continuing application of application Ser. No. 616,158, filed Feb. 15, 1967 (now abandoned), which is a continuing application of application Ser. No. 409,306, filed Nov. 5, 1964 (now abandoned).

BACKGROUND OF THE INVENTION

This disclosure relates to novel tertiary alkyl, cycloalkyl or aralkyl azo compounds containing one α-peracyl group per azo group; to processes for their preparation and to their use as polymerization initiators for vinyl monomers and as curing agents for polyester-resin compositions.

To the best of applicants' knowledge, no peracyl derivatives of azo-hydroperoxides of structure V have been previously reported. Phenylazohydroperoxides

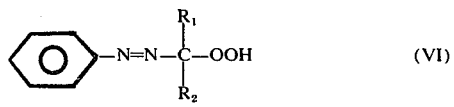
(VI)

have been reported [see for example R. Criegee et al., Chem. Ber. 84, 219 (1951); F. Minisci, Gazz. Chim. ital. 89, 626 (1959); K.H. Pausacker, J. Chem. Soc., 3478 (1950)], but it is not believed that any derivatives are reported to have been made of these compounds.

BRIEF SUMMARY OF THE INVENTION

This invention relates to:

A. Novel t-aliphatic azo ("t"=tertiary) compounds containing an α-peracyl group:

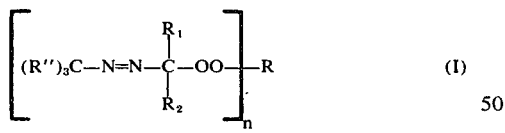
(I)

where:

$(R'')_3C$ is a $C_4$ to $C_{20}$ t-alkyl, cycloalkyl, alkylcycloalkyl, arylcycloalkyl or aralkyl radical where $R''$ is a $C_1$ to $C_8$ alkyl, $C_7$ to $C_{12}$ aralkyl or $C_6$ to $C_{14}$ aryl radical, not more than one $R''$ being aromatic, and where 2 or 3 of said $R''$s can join with the tertiary carbon atom to form a cyclo, bicyclo or tricyclo radical of 3 to 12 carbons;

n is 1 or 2;

R is $-\overset{O}{\overset{\|}{C}}R_3$, $-\overset{O}{\overset{\|}{C}}OR_4$, $-\overset{O}{\overset{\|}{C}}N(R_3)_2$, $-\overset{O}{\overset{\|}{C}}OOR_5$, $-\overset{O}{\overset{\|}{C}}SR_4$, $-\overset{O}{\overset{\|}{C}}Cl$,

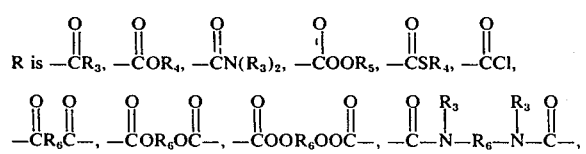

$-\overset{O}{\overset{\|}{C}}SR_6\overset{O}{\overset{\|}{SC}}-$ or $-\overset{O}{\overset{\|}{C}}-$;

$R_1$ and $R_2$ are separately selected from a $C_1$ to $C_8$ alkyl, $C_3$ to $C_{12}$ cyclo-, bicyclo - or tricycloalkyl or alkylcycloalkyl, $C_7$ to $C_{12}$ aralkyl and 5 to 6 membered heterocyclic radical or, taken together, $R_1$ and $R_2$ can form a $C_3$ to $C_{11}$ alkylene diradical, and $R_1$ can also be a $C_6$ to $C_{14}$ aryl radical;

$R_3$ is selected from hydrogen and a $C_1$ to $C_{12}$ alkyl, $C_6$ to $C_{14}$ aryl, $C_7$ to $C_9$ aralkyl or $C_3$ to $C_8$ cycloalkyl radical;

one or more of each of $R_1$, $R_2$ and $R_3$ can also be substituted with radicals selected from lower alkoxy, hydroxy, carboxy, alkoxycarbonyl, acyloxy, halogen, cyano, amido and alkylsulfonato;

$R_4$ is a $C_1$ to $C_{12}$ alkyl, $C_6$ to $C_{14}$ aryl, $C_7$ to $C_{12}$ aralkyl or $C_3$ to $C_{10}$ cycloalkyl or alkylcycloalkyl radical;

$R_5$ is a $C_4$ to $C_8$ t-alkyl or $C_9$ to $C_{12}$ t-aralkyl radical; and $R_6$ is a $C_1$ to $C_{12}$ alkyl, alkoxyalkyl, alkynyl or alkenyl, $C_3$ to $C_{10}$ cycloalkyl or alkylcycloalkylalkyl, or $C_6$ to $C_{14}$ aryl, alkylaralkyl or aralkylaryl diradical;

B. processes for preparing compounds I where R is $-\overset{O}{\overset{\|}{C}}R_3$ (n=1) or $-\overset{O}{\overset{\|}{C}}R_6\overset{O}{\overset{\|}{C}}-$ (n=2)

by reacting approximately equal molar equivalents of a tertiaryaliphatic α-(chloro)azo compound:

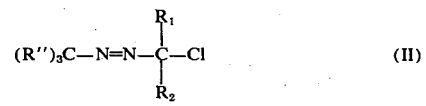
(II)

with a peracid (or its salt or salt solution) chosen from:

(III)

and

(IV)

where M is hydrogen, alkali metal (for example, sodium or potassium) or alkaline earth metal (e.g., calcium or barium), and $(R'')_3C$, $R_1,R_2$, $R_3$ and $R_6$ are as above defined;

C. processes for preparing compounds I by reacting t-aliphatic azo compounds of the formula

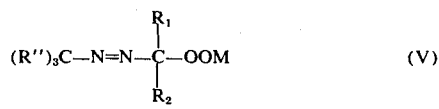
(V)

with the corresponding acylating agent such as mono- or di-acid halides

acid anhydrides [(R$_3$CO)$_2$O], phosgene, mono - or bis-haloformates

mono- or bis-peroxyhaloformates

mono- or bis-thiohaloformates

or

carbamoyl halides

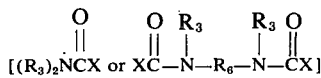

or mono - or di - isocyanates (R$_3$NCO or OCNR$_6$NCO) where X is chlorine or bromine (preferably chlorine) and (R'')$_3$C, n, R, R$_1$, R$_2$, R$_3$, R$_4$, R$_5$, R$_6$ and M are as defined above;

D. The use of novel compounds I as polymerization initiators (free radical generators) for the homo- or co-polymerization of ethylenically unsaturated monomers which are responsive at suitable temperatures to free radical generators, especially for initiating vinyl chloride polymerizations in the −10° to +60°C. temperature range (preferably 20°–40°C.); and E. The use of novel compounds I as curing agents (free radical initiators) for the curing of unsaturated polyester resin compositions in the presence of said novel compounds I, especially for curing unsaturated polyester vinyl monomer blends at temperatures of 20°–90°C., preferably at about room temperature.

DETAILED DESCRIPTION OF INVENTION

Process (B)

Preparation of the intermediate t-aliphatic α-(chloro) azo compounds (II) is described in our copending application Ser. No. 725,180, filed Apr. 29, 1968, now abandoned.

The reaction of II with III or IV is run in inert solvents such as ether, tetrahydrofuran, water, alcohols and formamides. The reaction can be run at from about −10°C. to about +30°C., preferably at 0–10°C., to obtain a reasonable reaction rate and a minimum of decomposition. The α-chloroazo compound is preferably added at a slow rate to a slurry or solution of the per-acid salt. The α-chloroazo compound can be added neat or in a solution of an inert solvent such as ether, hydrocarbons or chlorinated hydrocarbons. The reaction mixture is preferably worked up by diluting the reaction mixture with ice cold water, extracting the product with an organic solvent, drying the solution and removing the solvent if desired under reduced pressure at 0–10°C. Since the products are quite unstable at room temperature they must be stored below −10°C., preferably at −20°C. or lower.

Process(C)

Preparation of the t-aliphatic azo hydroperoxides and their salts (V) is described in our copending application Ser. No. 88,249, filed on Nov. 9, 1970, now (abandoned) entitled "Aliphatic α-(Hydroperoxy) Azo Compounds and Salts Thereof".

When M in (V) is hydrogen, the reaction is preferentially run in a relatively inert solvent such as water, ethers, hydrocarbons, dimethylformamide or dimethyl sulfoxide and an acid acceptor is employed.

Preferentially, tertiary amines such as pyridine, triethylamine or dimethylaniline are employed when using ethers, or hydrocarbons as the solvent. Inorganic bases such as sodium hydroxide, potassium hydroxide, sodium or potassium carbonates are preferentially used when aqueous systems are employed.

When the reaction is run using the alkali metal or alkaline earth salts of the structure V azo-hydroperoxides the same solvents may be used. Preferentially, however, when the anhydrous salts are employed, it is advantageous to eliminate water as a solvent. If aqueous solutions or suspensions of the azo-hydroperoxide salts are employed, the choice of solvents is not critical, but care must be taken not to hydrolyze the acylating agent.

Since the products are so thermally unstable, it is necessary to run the reaction at a low temperature, preferentially between −15° and 5°C. Therefore when using an aqueous system it is often advantageous to lower the freezing point of the water by the addition of a salt.

The order of addition of reagents is not critical but we have found that it is usually more convenient to add the acylating agent to the structure V azo-hydroperoxide (or its salt). Since the products are sensitive to acid, it is preferable to have a slight equivalent excess of the azo-hydroperoxide (or its salt) to the acylating agent. Due to the low thermal stability of these compounds it is essential that once the product is formed, the washes and subsequent workup should be carried out below room temperature, preferably below 0°C. Likewise any containers for holding these products should be pre-cooled before the azo-peroxide is added to it. The novel I compounds should be stored below 0°C, preferably around −20°C or below to prevent thermal decomposition. The novel I compounds are very susceptible to acid decomposition and practical grades of hydrocarbons should be washed with NaHCO$_3$ solution and dried before using as diluents. It is recommended that the novel I compounds be diluted with inert solvents such as hydrocarbons to at least 75% and preferably 50% for safety reasons.

Utility

These new compounds are free radical generators, polymerization initiators for vinyl monomers, curing agents for polyester resins, initiators for free radical initiated chemical reaction, blowing agents for producing foamed polymers and plastics, selective oxidizing agents and generators of reactant free radicals.

It has been observed that these new compounds are initiators for the polymerization or copolymerization of unsaturated monomers such as alkenes, vinyl halides, vinyl esters, vinylidene halides and alkenyl aromatics.

Illustrative polymerizable monomers are ethylene, vinyl chloride, vinylidene chloride, vinyl acetate, vinylpyridine, vinylpyrrolidone, vinylcarbazole, butadiene, isoprene, acrylonitrile, acrylic acid, acrylic acid esters, methacrylic acid, methacrylic acid esters, styrene, chlorostyrene, and methylstyrenes.

It is a further advantage of these compounds that many of these polymerizations can be carried out at room temperature or below without needing any activators or co-catalysts present. This is especially true in the case of vinyl chloride. Specific illustrations are given in the working examples.

These compounds are also very efficient curing agents of polyester resins, even at very low levels of catalyst concentration, at room temperature. The cured polyester resins were water white or off white in color and very hard.

Unsaturated polyesters which are used as the one component of the polyester resin compositions according to the present invention are, for instance, polyesters as they are obtained by esterifying preferably ethylenically unsaturated di-or polycarboxylic acid or their anhydrides, such as maleic acid, fumaric acid, glutaconic acid, itaconic acid, mesaconic acid, citraconic acid, allyl malonic acid, allyl succinic acid, and others, with saturated or unsaturated polyalcohols such as ethylene glycol; diethylene glycol (2,2'-dihydroxy ethyl ether); triethylene glycol (ethylene glycol bis-(2-hydroxy ethyl ether); propanediol-1,2; butanediol-1,3; 2,2-dimethyl propanediol-1,3; butene (2)-diol-1,4 glycerol, pentaerythritol, mannitol, and others. Mixtures of such acids and/or alcohols may also be used. The unsaturated di- or polycarboxylic acids may be replaced, at least partly, by saturated carboxylic acids such as adipic acid, succinic acid, sebacic acid, hydrophthalic acid, and others and their anhydrides such as phthalic anhydride. The acids used as well as the alcohols employed may be substituted by other substituents, preferably by halogen. Examples of suitable halogenated acids are, for instance, tetrachloro phthalic acid; 1,4,5,6,7,7-hexachloro bicyclo (2,2,1) heptene (5)-2,3-dicarboxylic acid, and others, or their anhydrides.

The other component of the unsaturated polyester resin compositions are unsaturated monomers, preferably ethylenically unsaturated monomers such as styrene, vinyl toluene, methyl methacrylate, diallyl phthalate, dibutyl fumarate, acrylonitrile, triallyl cyanurate, α-methyl styrene, divinyl benzene, methyl acrylate, diallyl maleate, n-butyl methacrylate, ethyl acrylate, and others, which are copolymerizable with said polyesters.

A preferred resin composition contains as the polyester component the esterification product of propylene glycol (a polyalcohol), maleic anhydride (anhydride of an unsaturated dicarboxylic acid) and phthalic anhydride (anhydride of an aromatic dicarboxylic acid) and as the monomer component styrene.

The novel I compounds evolve one mole of nitrogen gas per azo group in the compound when they decompose. In addition, other gasses are evolved from the breakdown and/or disproportionation of the radicals formed. Thus the novel I compounds are useful in applications where copious quantities of gasses are desired such as in producing foamed polymers.

Compounds

Many novel compounds of the present invention are taught in the examples to follow. Additional compounds which can be prepared according to processes (B) and (C) of this invention include:

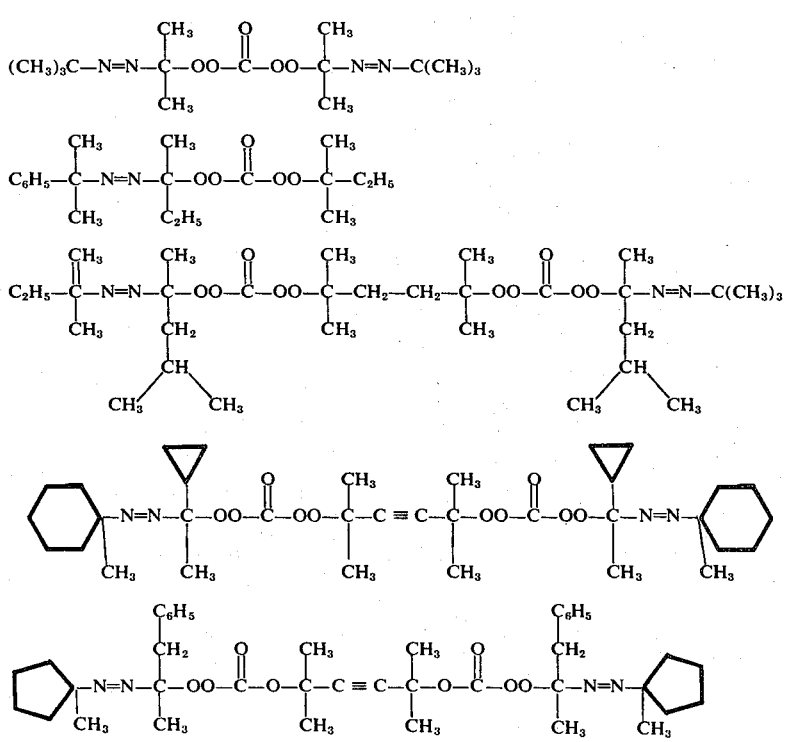

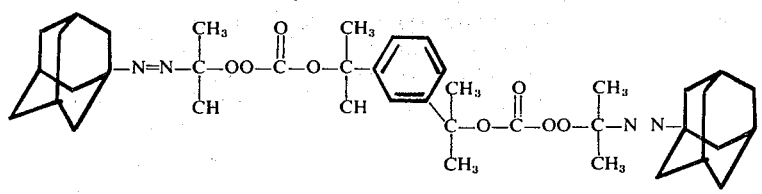
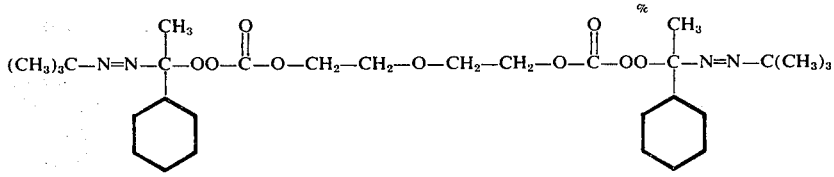
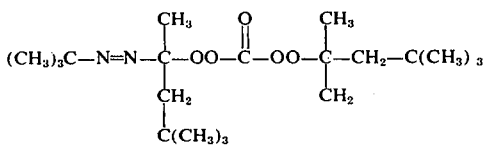
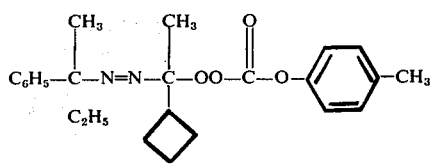
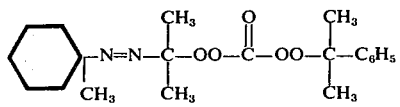
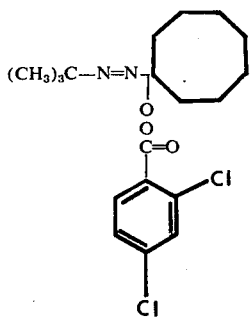
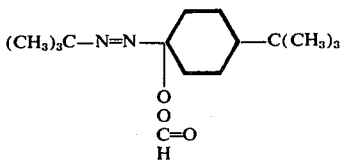
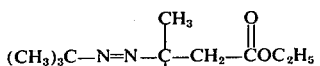
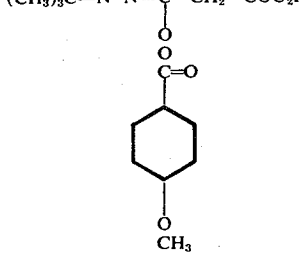

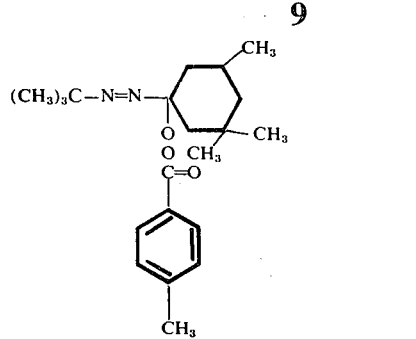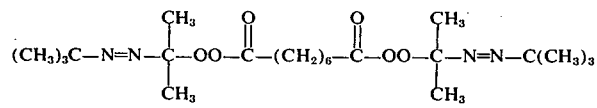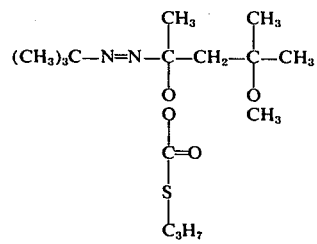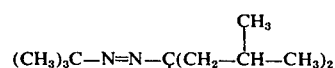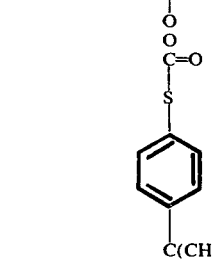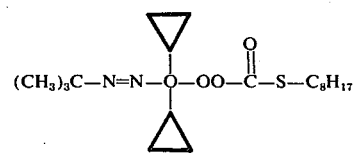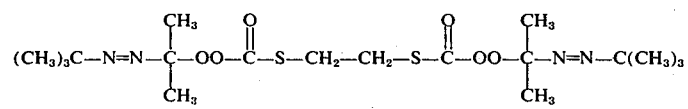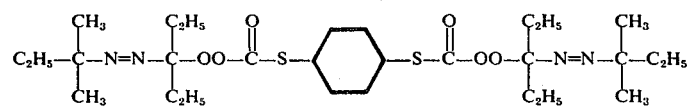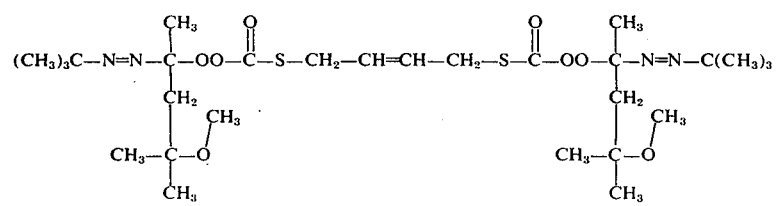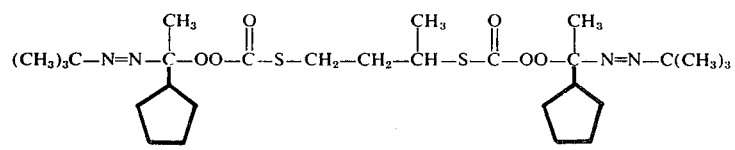

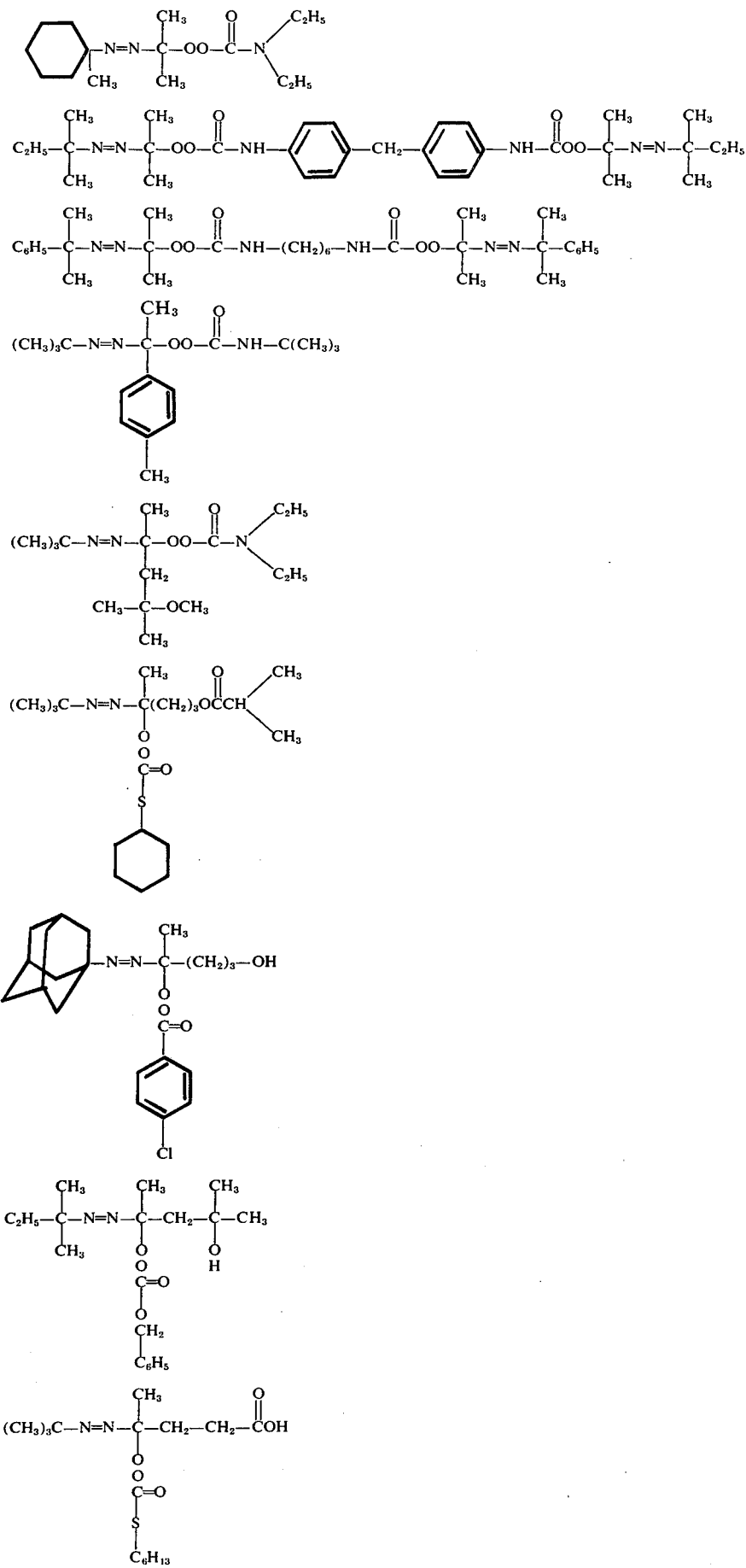

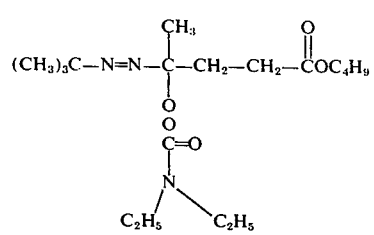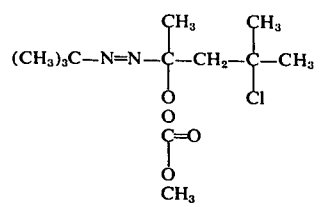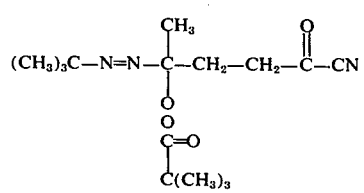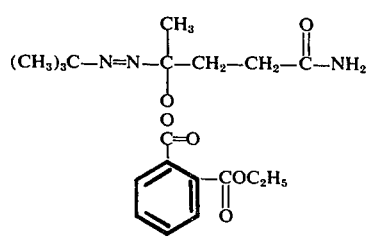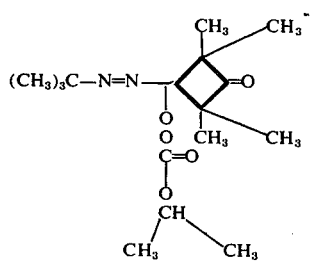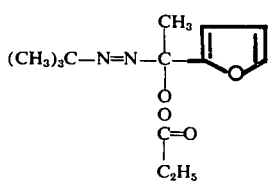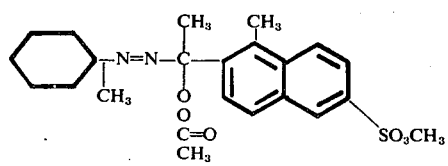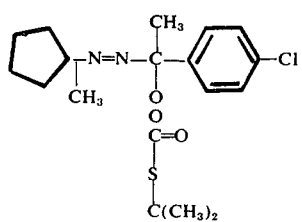

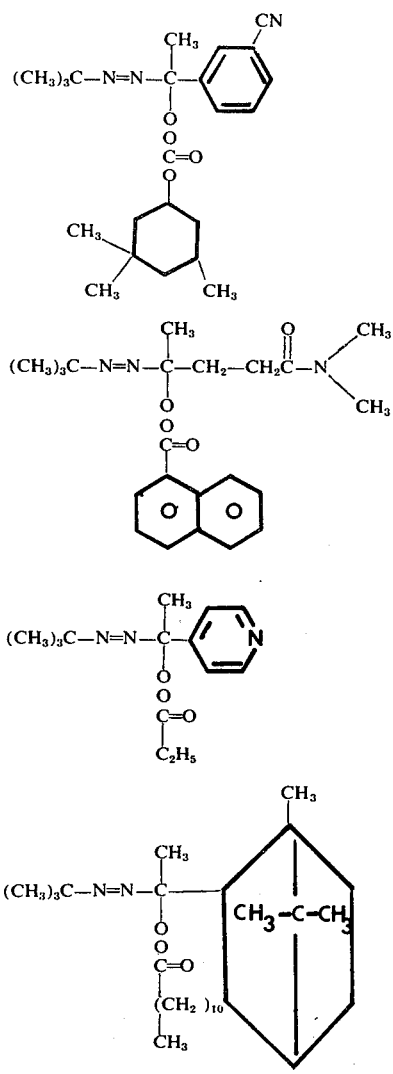
Further compounds which can likewise be prepared include those where the (R'')₃C- group in the above compounds is replaced by:
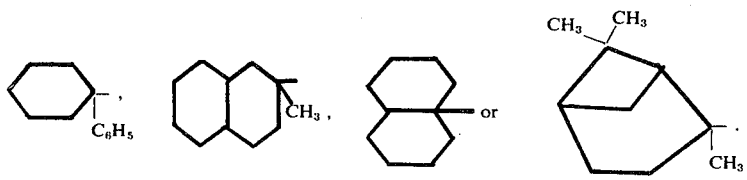
EXAMPLES
The following examples illustrate the invention but are not in limitation thereof.
EXAMPLE I
Preparation of
1-t-Butylazo-1-(benzoylperoxy)cyclohexane
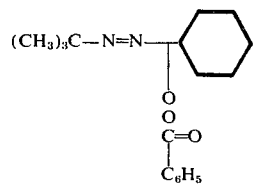

To a cold solution of 10 grams (.05 moles) of 1-t-butylazo-1-hydroperoxy-cyclohexane in 20 grams of odorless mineral spirits in a 250 ml. 4 neck round bottom flask, equipped with a magnetic stirrer, thermometer and water trap, was added 40 grams (0.05 moles) of 5% sodium hydroxide solution and the temperature was adjusted to 0°C by an ice-salt bath. The mixture became very viscous and the stirring became very difficult so 25 ml. of pentane was added. To this mixture was added 6.24 grams (.045 moles) of benzoyl chloride over 15 minutes, holding the temperature of the reaction below 7°C with the ice-salt bath. After the addition was complete, the reaction was stirred an additional 15 minutes at 0°C. There was slow bubbling in the water trap throughout the addition and stirring period indicating a slow evolution of nitrogen. At the end of the stirring period the organic layer was separated, washed with ice cold water, 5% NaHCO$_3$ solution, dried over anhydrous sodium sulfate, filtered and the pentane evaporated under reduced pressure while holding the temperature of the solution below 10°C. The product solution containing about 20 grams of odorless mineral spirits weighed 35.7 grams. The infrared spectrum of the product solution was in agreement with the structure of 1-t-butylazo-1-(benzoylperoxy)cyclohexane. The product solution was then stored in a dry ice chest to prevent decomposition.

EXAMPLE II

Curing an Unsaturated Polyester-Styrene Resin with 1-t-Butylazo-1-(benzoylperoxy)cyclohexane An unsaturated polyester resin was made by reacting maleic anhydride (1.0 mole), phthalic anhydride (1.0 mole), and propylene glycol (2.2 moles) until an acid number of 45–50 was obtained. To this was added hydroquinone at a 0.013% concentration. Seven parts of this unsaturated polyester was diluted with 3 parts of monomeric styrene to obtain a homogeneous blend having a viscosity of 13.08 poise and a specific gravity of 1.14.

To 20 grams of this blend was added 0.2 grams of the solution (about 33%) of 1-t-butylazo-1-(benyoylperoxy)cyclohexane in odorless mineral spirits prepared in Example I and the mixture stirred up well with a wooden spatula. The internal temperature was recorded as a function of time and a peak exotherm of 307°F (153°C) was reached in 5.6 minutes indicating an excellent cure of the unsaturated polyesterstyrene resin blend had occurred. The resultant cured material was very hard and was water white in color.

Without an initiator, no cure of this resin blend occurred even after more than 30 minutes at 212°F (100°C).

EXAMPLE III

Preparation of 2-t-Butylazo-2-(benzoylperoxy)propane

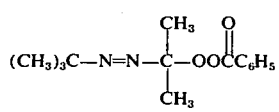

Method A

To a 0°C solution of 10 grams (0.0626 moles) of 2-t-butylazo-2-hydroperoxy-propane and 10 moles of pyridine in 20 grams of odorless mineral spirits in a 100 ml. 4 neck round bottom flask equipped with a magnetic stirrer, thermometer, condenser with drying tube and addition funnel, was added 8.4 grams (0.060 moles) of benzoyl chloride dropwise over 30 minutes, holding the temperature at 0°C with a dry ice-isopropanol bath. After the addition was complete, the reaction was stirred an additional 30 minutes at 5°C, 50 mls. of ice cold water added to dissolve the pyridine hydrochloride, the organic layer separated, washed with 50 mls. of 10% NaHCO$_3$, dried over anhydrous sodium sulfate, filtered and weighed. The light yellow liquid weighed 28.3 grams. The infrared spectrum was in agreement with the structure of 2-t-butylazo-2-benzoylperoxy)-propane and indicated that all the hydroperoxide had been esterified. The product was stored in a dry ice chest to prevent decomposition.

Method B

To a 0°C slurry of 1.68 grams (0.04 moles) of 57% sodium hydride in 150 ml. of pentane in a 250 ml. 4 neck round bottom flask equipped with a magnetic stirrer, thermometer, addition funnel, and gas outlet, was added 11.55 grams (.04 moles) of a 55.4% solution of 2-t-butylazo-2-hydroperoxypropane in hexane dropwise over a 15 minute period holding the temperature at 0°C. After the addition was complete, the reaction was stirred for 30 minutes at 0°C, cooled to −20°C with a dry ice-isopropanol bath and 5.35 grams (.038 moles) of benzoyl chloride added dropwise holding the temperature at −20° to −15°C with the dry ice bath. After the addition was complete the reaction was stirred for 30 minutes −20°C, filtered through anhydrous sodium sulfate and stored in a dry ice chest. A small sample of the pentane solution was placed in a flask on a rotating evaporator and the pentane evaporated at 0°C. Before the pentane could be completely removed, the sample decomposed. The product was too unstable to run an infrared spectrum on it.

EXAMPLE IV

Preparation of 2-t-Butylazo-2-(acetylperoxy)-4-methylpentane

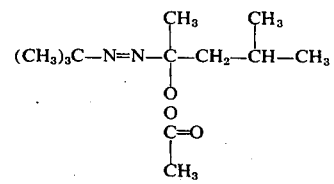

Method A

To a cold solution of 10 grams (0.05 moles) of 2-t-butylazo-2-hydroperoxy-4-methylpentane in 20 grams of odorless mineral spirits in a 100 ml. 3 neck round bottom flask, equipped with a mechanical stirrer, thermometer, and water trap, was added 20 grams (.05 moles) of 10% sodium hydroxide solution and the temperature was adjusted to 5°C by an ice bath. To the above stirred mixture was added 3.52 grams (0.045 moles) of acetyl chloride dropwise over 1 hour holding the reaction temperature below 10°C. After the addition was complete the organic layer was sampled and infrared spectrum run. The infrared spectrum indicated there was still a small amount of unreacted hydroperoxide present. Therefore an additional 5 grams of 10% sodium hydroxide was added to the reaction mixture followed by the dropwise addition of 1 gram of acetyl chloride. The reaction mixture was stirred an additional 15 minutes at 5°C, the organic layer separated, washed with ice cold 5% NaHCO₃ solution, dried over anhydrous sodium sulfate, filtered and weighed. The light yellow liquid weighed 29.8 grams (94% yield). The infrared spectrum was in agreement with the structure of 2-t-butylazo-2-(acetylperoxy)-4-methylpentane. It also indicated there was a trace of unreacted hydroperoxide present. The product was stored in a dry ice chest to prevent decomposition.

At a 1.0 weight percent loading the above solution cured the unsaturated polyester-styrene resin of Example II at room temperature giving a peak exotherm of 290°F (143°C) in 8.5 minutes and a very hard cured resin which was water white in color.

Method B

To a 0°C slurry of 1.74 grams (0.0412 moles) of 57% sodium hydride in 150 ml. of diethyl ether in a 500 ml. 4 neck round bottom flask equipped with a magnetic stirrer, thermometer, addition funnel, and gas outlet was added 16.6 grams (0.0412 moles) of 50% solution of 2-t-butylazo-2-hydroperoxy-4-methylpentane in odorless mineral spirits dropwise over a 15 minute period holding the temperature at 0° to 5°C. After the addition was complete, the reaction was stirred for 30 minutes at 0°C, cooled to −15°C with a dry ice-isopropanol bath and 4.21 grams (0.0412 moles) of acetic anhydride added dropwise over a 25 minute period holding the temperature at −15° to −10°C with the dry ice bath. After the addition was complete, the reaction was cooled to −20°C, stirred for 60 minutes, slowly warmed to −10°C and poured into 200 ml. of ice cold saturated NaHCO₃ solution. The ether layer was separated and washed with cold saturated NaHCO₃ solution, dried over anhydrous sodium sulfate, filtered and the ether removed under reduced pressure while holding the temperature of the solution below 5°C. The product solution (in odorless mineral spirits) weighed 13 grams and was stored in a dry ice chest to prevent decomposition.

Method C

The sodium salt of the hydroperoxide was prepared exactly as in method B above. The slurry of the sodium salt of the hydroperoxide in 150 ml. ether was cooled to 0°C and 3.24 grams (.0412 moles) of acetyl chloride added dropwise over a 15 minute period, holding the temperature at 0–5°C. After the addition was complete, the reaction was cooled to −10°C, stirred for 30 minutes and poured into 200 ml. of ice cold water. The ether layer was separated and worked up as in method B to give 13.7 grams of the product solution.

EXAMPLE V

Polymerization of Vinyl Chloride with 2-t-Butylazo 2-(acetylperoxy)-4-methylpentane 2-t-Butylazo-2-(acetylperoxy)-4-methylpentane from Example IV was used as an initiator in the polymerization of vinyl chloride using the well known bottle polymerization technique at autogenous pressures. The formulation used in evaluation is set out below:

| | |
|---|---|
| Vinyl chloride monomer | 100 grams |
| Water (distilled) | 210 ml. |
| *Methocel (1500 cps) (1% solution) | 20 ml. |
| Sorbitan monostearate (1% solution) | 10 ml. |
| Polyoxyethylene sorbitan monostearate (1% solution) | 10 ml. |
| 2-t-Butylazo-2-(acetylperoxy)-4-methylpentane | variable |

(from Example IV-method c)
*A hydroxypropyl methylcellulose product of Dow Chemical.

A water suspension was prepared as set out in the above formulation and added to a 24 ounce beverage bottle which was then frozen at −20°C. A series of bottles was prepared and varying amounts of the initiator added, followed by the freshly distilled vinyl chloride. The bottles were capped, and placed in a water bath thermostatted at 30°C. The bath was equipped to cause the rotation of the bottles end over end. After the polymerization had continued at 30°C for 16 hours, the bottles were cooled, vented of excess vinyl chloride monomer, and the yield of poly(vinyl chloride) determined gravimetrically. It was found that 0.1 grams of 2-t-butylazo-2-(acetylperoxy)-4-methylpentane were required per 100 grams of vinyl chloride monomer to obtain a 56% conversion to poly(vinyl chloride).

EXAMPLE VI

Preparation of 2-t-Butylazo-2-(benzoylperoxy)-4-methylpentane

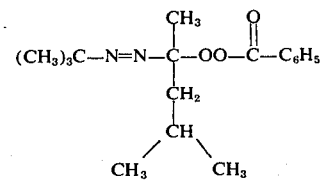

To a 5°C slurry of 1.38 grams (0.0328 moles) of 57% sodium hydride in 150 ml. of ether in a 500 ml. 4 neck round bottom flask equipped with a magnetic stirrer, thermometer, addition funnel and gas outlet, was added 12.8 grams (0.0328 moles) of a 50% solution of 2-t-butylazo-2-hydroperoxy-4-methylpentane in odorless mineral spirits dropwise over a 20 minute period holding the temperature at 0° to 5°C. After the addition was complete, the reaction was stirred for 30 minutes at 0° to 5°C and then 4.62 grams (0.328 moles) of benzoyl chloride added dropwise holding the temperature below 5°C. After the addition was complete, the reaction was stirred for 30 minutes at 0° to 5°C, poured into 150 ml. of ice cold water and the ether layer separated. The ether solution was washed with ice cold water, saturated NaHCO₃ solution, water, dried over anhydrous sodium sulfate, filtered and the ether evaporated under reduced pressure at 0° to 5°C. The product solution weighed 12.6 grams. The infrared spectrum indicated the product contained some unreacted benzoyl chloride.

EXAMPLE VII

Preparation of 2-t-Butylazo-2-(acetylperoxy)propane

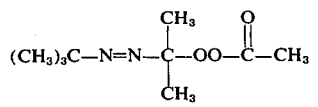

To a 0°C slurry of 2.08 grams (0.0495 moles) of 57% sodium hydride in 150 ml. of pentane in a 250 ml. 4 neck round bottom flask equipped with a magnetic stirrer, thermometer, addition funnel and gas outlet, was added 14.3 grams (0.0495 moles) of a 55.4% solution of 2-t-butylazo-2-hydroperoxypropane in hexane dropwise over a 15 minute period holding the temperature at 0°C. After the addition was complete, the reaction was stirred for 30 minutes at 0°C, cooled to −20°C and 3.88 grams (0.0495 moles) of acetyl chloride added dropwise holding the temperature at −20°C with a dry ice-isopropanol bath. After the addition was complete, the reaction was stirred for 40 minutes at −20°C, filtered through anhydrous sodium sulfate and stored in a dry ice chest. A small sample of the pentane solution was placed in a flask on a rotating evaporator and the pentane and hexane evaporator at 0°C. When the pentane-hexane solution was almost completely stripped, the product decomposed, evolving heavy white smoke.

EXAMPLE VIII

Preparation of 2-t-Butylazo-2-(propoxycarbonylperoxy)-4-methylpentane

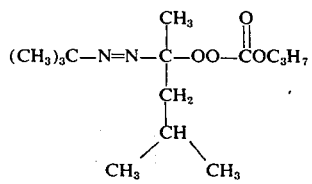

To a 0°C slurry of 1.48 grams (0.035 moles) of 57% sodium hydride in 150 ml. of ether in a 500 ml. reaction flask equipped with a mganetic stirrer, thermometer, addition funnel and gas outlet, was added 14.1 grams (0.035 moles) of a 50% solution of 2-t-butylazo-2-hydroperoxy-4-methylpentane in odorless mineral spirits dropwise over a 15 minute period, holding the temperature at 0°-[°C. After the addition was complete, the reaction was stirred for 20 minutes at 0°-5°C, cooled to −10°C with a dry ice-isopropanol bath and 4.3 grams (0.035 moles) of n-propyl chloroformate added dropwise over a 20 minute period, holding the temperature at −10°C with the dry ice bath. After the addition was complete, the reaction was stirred for 30 minutes at −15°C, slowly warmed to −5°C and poured into 200 ml. of ice cold water. The ether layer was separated and washed with ice cold saturated NaHCO$_3$, water, dried over anhydrous sodium sulfate, filtered and the ether evaporated under reduced pressure at 0°C to leave 12.4 grams of a light yellow liquid. The infrared spectrum of the product solution (in odorless mineral spirits) indicated there was a small amount of unreacted n-propyl chloroformate present in the product.

At a 1.0 weight percent loading the above mineral spirit solution cured the unsaturated polyester-styrene resin of Example II at room temperature giving a peak exotherm of 295°F (146°C) in 5.0 minutes and a very hard cured resin which was water white in color.

In the polymerization of vinyl chloride (16 hours at 30°C) using the procedure described in Example V, it was found that 0.10 grams of 2-t-butylazo-2-(propoxycarbonylperoxy)-4-methylpentane were required per 100 grams of vinyl chloride monomer to obtain a 55% conversion to poly(vinyl chloride).

EXAMPLE IX

Preparation of O,O-[1-(t-Butylazo)-1,3-dimethylbutyl]S-Dodecyl Monoperoxythiocarbonate

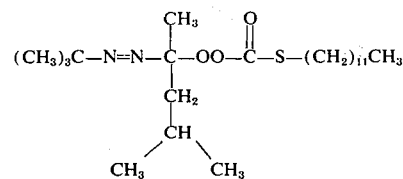

To a 0°C slurry of 1.01 grams (0.024 moles) of 57% sodium hydride in 150 ml. of hexane in a 250 ml. reaction flask equipped with a magnetic stirrer, thermometer, addition funnel and gas outlet, was added 9.67 grams (0.024 moles) of a 50% solution of 2-t-butylazo-2-hydroperoxy-4-methylpentane in odorless mineral spirits dropwise over a 15 minute period, holding the temperature at 0–5°C. After the addition was complete, the reaction was stirred for 20 minutes at 0°C, cooled at −10°C, with a dry ice-isopropanol bath and 6.3 grams (0.0238 moles) of dodecyl thiochloroformate added dropwise holding the temperature at −15°to −10°C. After the addition was complete, the reaction was stirred for 45 minutes at −10°C, filtered through anhydrous sodium sulfate and stored in the dry ice chest. The hexane was evaporated from a small sample under reduced pressure at 0° C without the product decomposing. The infrared spectrum was in agreement with the structure of the desired product.

EXAMPLE X

Preparation of S,S'-Hexamethylene bis[O,O-(2-t-butylazo-isopropyl) Monoperoxythiocarbonate]

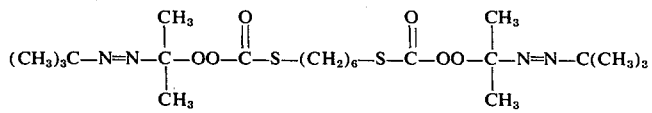

To a 0°C slurry of 1.62 grams (0.0362 moles) of 57% sodium hydride in 100 ml. of hexane in a 250 ml. reaction flask equipped with a magnetic stirrer, thermometer, addition funnel and gas outlet, was added 11.1 grams (0.0385 moles) of a 55.4% solution of 2-t-butylazo-2-hydroperoxypropane in hexane dropwise over a 15 minute period, holding the temperature at 0°-5°C. After the addition was complete, the reaction was stirred for 30 minutes at 0°C, cooled to −15°C with a dry ice-isopropanol bath and 5.24 grams (0.0192 moles) of S,S'-hexamethylene bisthiochloroformate added dropwise over a 30 minute period holding the temperature at −20° to −15°C. After the addition was complete, the reaction was stirred for 60 minutes at −20°C, filtered through anhydrous sodium sulfate and stored in the dry ice chest. A small sample of the product was purified by low temperature recrystallization. The product decomposed however upon isolation.

EXAMPLE XI

Preparation of O,O-[1-(t-Butylazo)-1,3-dimethylbutyl] Hydrogen Monoperoxyphthalate

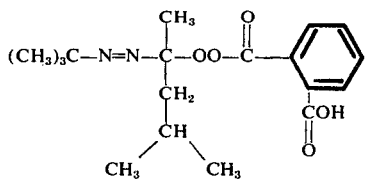

To a 0°C slurry of 0.603 grams (0.0143 moles) of 57% sodium hydride in 60 ml. of hexane in a 250 ml. reaction flask equipped with a magnetic stirrer, thermometer, addition funnel and gas outlet, was added 5.76 grams (0.0143 moles) of a 50% solution of 2-t-butylazo-2-hydroperoxy-4-methylpentane in odorless mineral spirits dropwise holding the temperature at 0°–5°C. After the addition was complete, the reaction was stirred for 30 minutes at 0–5°C, cooled to −10°C and 2.12 grams (0.0143 moles) of phthalic anhydride slowly added while holding the temperature at −10°C. The phthalic anhydride was not readily soluble in the hexane so the reaction was stirred for 4 hours at −10°C, warmed to 0°C and 50 mls. of ice cold water added. Dilute hydrochloric acid was then added until the pH dropped to 5. The hexane layer was separated, washed with 50 mls. of ice cold water, dried over anhydrous sodium sulfate, filtered and the hexane evaporated under reduced pressure to leave 4.2 grams of a straw yellow liquid. The infrared spectrum of the residue was in agreement with the structure of a hydrocaarbon solution of the desired azo-perester.

At a 3.0 weight percent loading the above mineral spirit solution cured the unsaturated polyester-styrene resin of Example II at room temperature giving a peak exotherm of 295°F (146°C) in 4.4 minutes and a very hard cured resin.

EXAMPLE XII

Preparation of O,O-[1-(t-Butylazo)-1,3-dimethylbutyl] Hydrogen Monoperoxygluturate

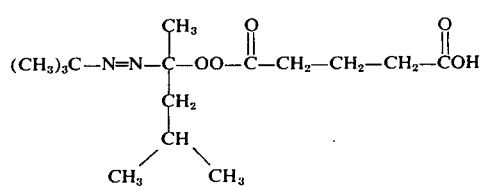

O,O-[1-(t-Butylazo)-1,3-dimethylbutyl] hydrogen monoperoxygluturate was prepared in 56% crude yield using the same method described in Example XI for the synthesis of O,O-[1-(t-butylazo)- 1,3-dimethylbutyl] hydrogen monoperoxyphthalate substituting an equivalent amount of glutaric anhydride for the phthalic anhydride of example XI.

At a 2.0 weight percent loading the mineral spirit solution of O,O-[1-(t-butylazo)-1,3-dimethylbutyl] hydrogen monoperoxygluturate cured the unsaturated polyester-styrene resin of Example II at room temperature giving a peak exotherm of 300°F (148°C) in 2.8 minutes and a very hard cured resin.

EXAMPLE XIII

Preparation of Di(1-t-butylazo-1,3-dimethylbutyl) Diperoxysebacate

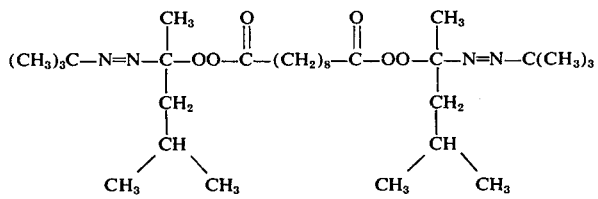

To a 0°C slurry of 0.74 grams (0.0176 moles) of 57% sodium hydride in 60 ml. of hexane in a 250 ml. reaction flask equipped with a magnetic stirrer, thermometer, addition funnel and gas outlet, was added 7.1 grams (0.0176 moles) of a 50% solution of 2-t-butylazo-2-hydroperoxy-4-methylpentane in odorless mineral spirits dropwise holding the temperature at 0–5°C. After the addition was complete, the reaction was stirred for 30 minutes at 0–5°C, cooled to −15°C and 2.1 grams (0.008 moles) of sebacoyl chloride added dropwise holding the temperature at −15° to −10°C. After the addition was complete, the reaction was stirred for 60 minutes at −20°C, warmed to −10°C, filtered through anhydrous sodium sulfate and stored in the dry ice chest. The infrared spectrum of the product was in agreement with the structure of a hydrocarbon solution of the desired azo-perester.

At a 1.0 weight percent loading the above mineral spirits solution cured the unsaturated polyester-styrene resin of Example II at room temperature giving a peak exotherm of 190°F (88°C) in 7.5 minutes.

EXAMPLE XIV

Preparation of 2-t-Butylazo-2-(benzoylperoxy)-3-methoxy-4-methylpentane

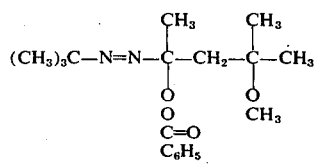

To a 0°C slurry of 0.84 grams (0.02 moles) of 57% sodium hydride in 50 ml. of hexane in a 250 ml. reaction flask equipped with a magnetic stirrer, thermometer, addition funnel and gas outlet, was added 9.3 grams (0.02 moles) of a 50% solution of 2-t-butylazo-2-hydroperoxy-4-methoxy-4-methylpentane in odorless mineral spirits dropwise holding the temperature at 0–5°C. After the addition was complete, the reaction was stirred for 20 minutes at 0°C, cooled to −10°C and 2.81 grams (.02 moles) of benzoyl chloride added dropwise over a 15 minute period holding the temperature at −10°C. After the addition was complete, the reaction was stirred for 90 minutes at −20°C, filtered through anhydrous sodium sulfate and stored in a dry ice chest.

At a 1.0 weight percent loading the above mineral spirits solution cured the polyester-styrene resin of Example II at room temperature giving a peak exotherm of 130°F (55°C) in 8.5 minutes.

EXAMPLE XV

Preparation of Di[1-(t-butylazo)-1,3-dimethylbutyl]Diperoxterepphthalate

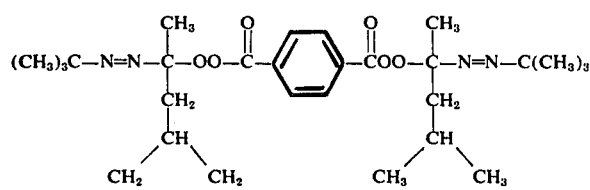

Di[1-(t-butylazo)-1,3-dimethylbutyl]diperoxyterephthalate was prepared using the same method described in Example XIII for the syntheses of di[1-(t-butylazo)-1,3-dimethylbutyl] diperoxysebacate, substituting an equivalent amount of terephthaloyl chloride for the sebacoyl chloride of Example XIII.

EXAMPLE XVI

Preparation of 1,4-Cyclohexylenedimethyl Bis[O,O-(1-t-butylazo-1,3-dimethylbutyl) monoperoxycarbonate]

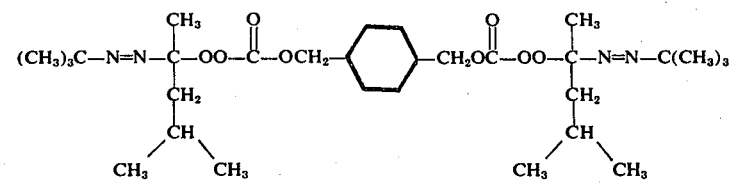

To a 0°C slurry of 0.84 grams (0.02 moles) of 57% sodium hydride in 50 ml. of hexane in a 250 ml. reaction flask equipped with a magnetic stirrer, thermometer, addition funnel, and gas outlet, was added 8.05 grams (0.02 moles) of a 50% solution of 2-t-butylazo-2-hydroperoxy-4-methylpentane in odorless mineral spirits dropwise holding the temperature at 0°–5°C. After the addition was complete, the reaction was stirred for 20 minutes at 0°–5°C, cooled to −10°C and 2.71 grams (0.01 moles of 1,4-cyclohexylenedimethyl bischloroformate added holding the temperature at −15° to −10°C. After the addition was complete, the reaction was stirred for 60 minutes at −20°C, filtered through anhydrous sodium sulfate and stored in a dry ice chest.

EXAMPLE XVII

Preparation of 2-(t-Butylazo)-2-(N,N-diethylcarbamoylperoxy)-4-methylpentane

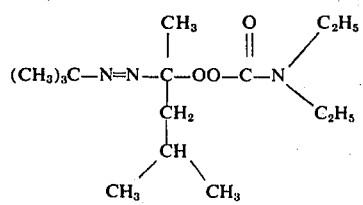

To a 0°C slurry of 0.84 grams (0.02 moles) of 57% sodium hydride in 60 ml. of hexane in a 250 ml. 4 neck round bottom flask equipped with a magnetic stirrer, thermometer, addition funnel and gas outlet, was added 8.05 grams (0.02 moles) of a 50% solution of 2-t-butylazo-2-hydroperoxy-4-methylpentane in odorless mineral spirits dropwise holding the temperature at 0°–5°C. After the addition was complete, the reaction was stirred for an additional 20 minutes at 0°C, cooled to −15°C and 2.71 grams (.02 moles) of diethylcarbamoyl chloride added dropwise, holding the temperature between −15° and −10°C. After the addition was complete, the reaction mixture was stirred for 80 minutes at −20°C, filtered through anhydrous sodium sulfate and stored in a dry ice chest. The hexane was evaporated from a small portion of the filtrate under reduced pressure at 0° C. An infrared spectrum of the stripped solution was in agreement with the structure of 2-(t-butylazo)-2-(N,N-diethylcarbamoylperoxy)-4-methylpentane in a hydrocarbon solvent.

At a 0.5 weight percent loading, the above stripped sample cured the unsaturated polyester-styrene resin of Example II at room temperature giving a peak exotherm of 151°F (66°C) in 5.0 minutes. At a 1.0 weight percent loading the sample cured the unsaturated polyester-styrene resin at a rate that was too fast to measure.

EXAMPLE XVIII

Preparation of 2-(t-Butylazo)-2-N-butylcarbamoylperoxy)-4-methylpentane

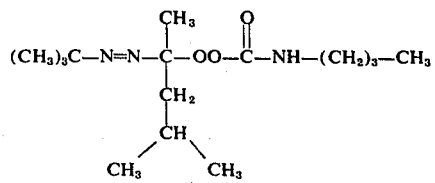

To a solution of 8.05 grams (0.02 moles) of a 50% solution of 2-t-butylazo-2-hydroperoxy-4-methylpentane in odorless mineral spirits and 8 drops of triethylamine in 50 ml. of hexane cooled to −10°C in a 250 ml. 4 neck round bottom flask, equipped with a magnetic stirrer, thermometer, addition funnel and gas outlet, was added dropwise 1.98 grams (0.02 moles) of n-butyl isocyanate. The reaction mixture was allowed to warm to 0°C, stirred for 2 hours at 0°C and then stirred an additional 90 minutes at 5°–10°C. During the stirring period a solid slowly precipitated out of solution. There was no evidence of any decomposition occurring during the stirring period. The reaction mixture was stored overnight in a dry ice chest. The next morning the hexane was evaporated from a small portion of the sample under reduced pressure at 0°C. An infrared spectrum of the stripped solution was in agreement with the structure of 2-(t-butylazo)-2-(N-butylcarbamoylperoxy)-4-methylpentane in a hydrocarbon solvent. It also indicated there were small amounts of unreacted starting materials present.

At a 1.0 weight percent loading the above stripped mineral spirit solution cured the unsaturated polyester-styrene resin of Example II at room temperature giving a peak exotherm of 284°F (140°C) in 5.3 minutes and a very hard cured resin.

EXAMPLE XIX

Preparation of 2-(t-Butylazo)-2-(N-cyclohexylcarbamoylperoxy)propane

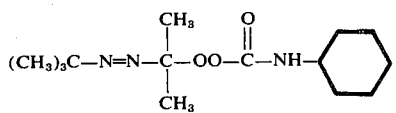

To a 0°C slurry of 0.84 grams (0.02 moles of 57% sodium hydride in 50 ml. of hexane in a 250 ml. 4 neck round bottom flask equipped with a magnetic stirrer, thermometer, addition funnel and gas outlet, was added 6.4 grams (0.02 moles) of a 50% solution of 2-t-butylazo-2-hydroperoxypropane dropwise holding the temperature at 0°–5°C. After the addition was complete, the reaction was stirred for 30 minutes at 0°–5°C, cooled to −15°C and 2.5 grams (.02 moles) of cyclohexyl isocyanate added dropwise, holding the temperatue at −15° to −10°C. After the addition was complete, the reaction was stirred for 90 minutes at −15°C, warmed to −5°C and 2 ml. of water added. The reaction was stirred for 5 minutes, dried over anhydrous sodium sulfate, filtered and the filtrate stored in a dry ice chest. The hexane was evaporated from a small portion of the filtrate under reduced pressure at 0°C. An infrared spectrum of the residue was in agreement with the structure of 2-(t-butylazo)-2-(N-cyclohexylcarbamoylperoxy)propane. There were also small portions of the unreacted starting material present.

EXAMPLE XX

Preparation of 2-(t-Butylazo)isopropyl Peroxychloroformate

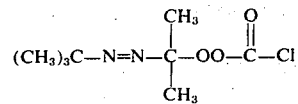

To a 0°C slurry of 0.95 grams (0.0226 moles) of 57% sodium hydride in 50 ml. of hexane in a 100 ml. 4 neck round bottom flask equipped with a magnetic stirrer, thermometer, addition funnel and gas outlet, was added 6.6 grams (0.0226 moles) of a 55% solution of 2-t-butylazo-2-hydroperoxypropane in hexane dropwise holding the temperature at 0° to 5°C with an ice bath. After the addition was complete, the reaction was stirred for 60 minutes at 0°C.

In the meantime, a clean 250 ml. 4 neck flask equipped with a magnetic stirrer and thermometer and containing 50 ml. of hexane was cooled to −15° and 2.8 ml. (0.04 moles) of phosgene added to it. With rapid stirring, the slurry of the sodium salt of the azohydroperoxide prepared above was slowly added to the phosgene solution over a 20 minute period, holding the reaction temperature at −15°C with a dry ice bath. After the addition was complete, the reaction mixture was stirred for an additional 45 minutes at −15°C, filtered through anhydrous sodium sulfate and stored in a dry ice chest.

An attempt was made to remove the hexane from a small portion of the sample by vacuum stripping of the sample at 0°C but upon removal of most of the solvent, the residue rapidly decomposed.

EXAMPLE XXI

Preparation of Di(O,O-2-t-butylazoisopropyl) Diperoxycarbonate

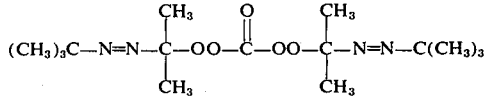

To a 0°C slurry of 1.68 grams (0.04 moles) of 57% sodium hydride in 80 ml. of hexane in a 250 ml. 4 neck round bottom flask equipped with magnetic stirrer, thermometer, addition funnel, and gas outlet, was added 11.6 grams (0.04 moles) of a 55% solution of 2-t-butylazo-2-hydroperoxypropane in hexane dropwise holding the temperature at 0° 5°C with an ice bath. After the addition was complete, the reaction was stirred for 40 minutes at 0°C, cooled to −15°C and 1.41 mls. (0.02 moles) of phosgene added dropwise over a 30 minute period holding the temperature at −15° to −10°C with a dry ice bath. After the addition was complete, the reaction mixture was stirred for an additional 45 minutes at −15°C, filtered through anhydrous sodium sulfate and stored in a dry ice chest.

An attempt was made to remove the hexane from a small portion of the sample by vacuum stripping of the sample at 0°C but upon removal of most of the solvent, the residue rapidly decomposed.

What is claimed is:

1. In a process for the homo- or copolymerization of ethylenically unsaturated monomers which are responsive at suitable temperatures to free radical generators as polymerizaation initiators, the improvement which comprises employing as free radical generator t-aliphatic α-(peracyl)azo compounds of the formula

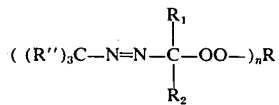

where:
$(R'')_3C$ is a $C_4$–$C_{20}$ tertiary alkyl, cycloalkyl, arylcycloalkyl, alkylcycloalkyl or aralkyl group where each $R''$ is separately selected from $C_1$–$C_8$ alkyl, $C_6$–$C_{14}$ aryl or $C_7$–$C_{12}$ aralkyl, not more than one $R''$ being aromatic, and 2 or 3 of said $R''$s when taken together with the t-carbon atom form a cyclo-, bicyclo-, or tricycloalkyl radical of 3–12 carbons;

$n$ is 1 or 2;

R is —C(=O)R$_3$, —C(=O)OR$_4$, —C(=O)N(R$_3$)$_2$, —C(=O)OOR$_5$, —C(=O)SR$_4$, —C(=O)Cl, —C(=O)R$_6$C(=O)—, —C(=O)OR$_6$OC(=O)—, —C(=O)OOR$_6$OOC(=O)—, —C(=O)N(R$_3$)R$_6$N(R$_3$)C(=O)—, —C(=O)SR$_6$SC(=O)— or —C(=O)—;

R$_1$ and R$_2$ are $C_1$–$C_8$ alkyl, $C_3$–$C_{12}$ cyclo-, bicyclo- or tricycloalkyl or alkylcycloalkyl, $C_7$–$C_{12}$ aralkyl, or 5–6 membered heterocyclic, or R$_1$ and R$_2$ taken together form a $C_3$–$C_{11}$ alkylene diradical, and R$_1$ can also be $C_6$–$C_{14}$ aryl;

R$_3$ is selected from hydrogen and $C_1$–$C_{12}$ alkyl, $C_6$–$C_{14}$ aryl, $C_7$–$C_9$ aralkyl or $C_3$–$C_8$ cycloalkyl;

one or more of each of R$_1$, R$_2$ and R$_3$ can be substituted with radicals selected from lower alkoxy, hydroxy, carboxy, lower alkoxycarbonyl, lower acyloxy, halo, cyano, amido and lower alkylsulfonato;

R$_4$ is $C_1$–$C_{12}$ alkyl, $C_6$–$C_{14}$ aryl, $C_7$–$C_{12}$ aralkyl or $C_3$–$C_{10}$ cycloalkyl or alkylcycloalkyl;

R$_5$ is $C_4$–$C_8$ t-alkyl or $C_9$–$C_{12}$ t-aralkyl; and

R$_6$ is a $C_1$–$C_{12}$ alkyl, alkoxyalkyl, alkynyl or alkenyl, $C_3$–$C_{10}$ cycloalkyl or alkylcycloalkylalkyl, or $C_6$–$C_{14}$ aryl, alkylaralkyl or aralkylaryl diradical.

2. In a process for curing an unsaturated polyester resin composition in the presence of a free radical initiator, the improvement which comprises employing as said initiator t-aliphatic α-(peracyl)azo compounds of the formula

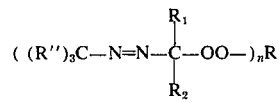

where
$(R'')_3C$ is a $C_4$–$C_{20}$ tertiary alkyl, cycloalkyl, arylcycloalkyl, alkylcycloalkyl or aralkyl group where each $R''$ is separately selected from $C_1$–$C_8$ alkyl, $C_6$–$C_{14}$ aryl or $C_7$–$C_{12}$ aralkyl, not more than one $R''$ being aromatic, and 2 or 3 or said $R''$s when taken together with the t-carbon atom form a cyclo-, bicyclo-, or tricycloalkyl radical of 3–12 carbons;

$n$ is 1 or 2;

R is —C(=O)R$_3$, —C(=O)OR$_4$, —C(=O)N(R$_3$)$_2$, —C(=O)OOR$_5$, —C(=O)SR$_4$, —C(=O)Cl, —C(=O)R$_6$C(=O)—, —C(=O)OR$_6$OC(=O)—, —C(=O)OOR$_6$OOC(=O)—, —C(=O)N(R$_3$) R$_6$N (R$_3$)C(=O)—, —C(=O)SR$_6$SC(=O)— or —C(=O)—;

R$_1$ and R$_2$ are $C_1$–$C_8$ alkyl, $C_3$–$C_{12}$ cyclo-, bicyclo- or tricycloalkyl or alkylcycloalkyl, $C_7$–$C_{12}$ aralkyl, or 5–6 membered heterocyclic, or R$_1$ and R$_2$ taken together form a $C_3$–$C_{11}$ alkylene diradical, and R$_1$ can also be $C_6$–$C_{14}$ aryl;

R$_3$ is selected from hydrogen and $C_1$–$C_{12}$ alkyl, $C_6$–$C_{14}$ aryl, $C_7$–$C_9$ aralkyl or $C_3$–$C_8$ cycloalkyl;

one or more of each of R$_1$, R$_2$ and R$_3$ can be substituted with radicals selected from lower alkoxy, hydroxy, carboxy, lower alkoxycarbonyl, lower acyloxy, halo, cyano, amido and lower alkylsulfonato;

R$_4$ is $C_1$–$C_{12}$ alkyl, $C_6$–$C_{14}$ aryl, $C_7$–$C_{12}$ aralkyl or $C_3$–$C_{10}$ cycloalkyl or alkylcycloalkyl;

R$_5$ is $C_4$–$C_8$ t-alkyl or $C_9$–$C_{12}$ t-aralkyl; and

R$_6$ is a $C_1$–$C_{12}$ alkyl, alkoxyalkyl, alkynyl or alkenyl, $C_3$–$C_{10}$ cycloalkyl or alkylcycloalkylalkyl, or $C_6$–$C_{14}$ aryl, alkylaralkyl or aralkylaryl diradical.

3. Claim 1 wherein the monomer is vinyl chloride and the polymerization temperature is in the range of −10° to +60°C.

4. claim 3 wherein the generator is 2-t-butylazo-2-(acetylperoxy)-4-methylpentane.

5. claim 2 wherein said composition comprises (a) the esterification product of propylene glycol, maleic anhydride and phthalic anhydride in admixture with (b) monomeric styrene, and the curing temperature is in the range of 20°–90°C.

6. claim 5 wherein the initiator is 1-t-butylazo-1-(benzoylperoxy) cyclohexane.

* * * * *